United States Patent [19]
Petrakovich et al.

[11] Patent Number: 6,017,653
[45] Date of Patent: *Jan. 25, 2000

[54] METHOD OF MANUFACTURING MODULAR MOLDED COMPONENTS FOR A BIPOLAR BATTERY AND THE RESULTING BIPOLAR BATTERY

[75] Inventors: Stephen G. Petrakovich, Columbus, Ga.; William H. Kump, St. Paul, Minn.

[73] Assignee: GNB Technologies, Inc., Mendota Heights, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/641,500

[22] Filed: May 1, 1996

Related U.S. Application Data

[63] Continuation of application No. 08/613,925, Mar. 11, 1996, abandoned.

[51] Int. Cl.[7] .................................................. H01M 10/18
[52] U.S. Cl. ......................... 429/210; 429/234; 429/246
[58] Field of Search .................... 429/210, 234, 429/246, 185

[56] References Cited

U.S. PATENT DOCUMENTS

| | | |
|---|---|---|
| 2,416,576 | 2/1947 | Franz et al. . |
| 2,496,709 | 2/1950 | Gelardin . |
| 2,966,538 | 12/1960 | Bernot . |
| 3,728,158 | 4/1973 | Poe et al. . |
| 3,775,189 | 11/1973 | Jaggard . |
| 3,941,615 | 3/1976 | McDowall . |
| 4,125,680 | 11/1978 | Shropshire et al. . |
| 4,964,878 | 10/1990 | Morris . |
| 5,035,045 | 7/1991 | Bowen et al. ........................ 29/623.2 |
| 5,068,160 | 11/1991 | Clough et al. . |
| 5,348,817 | 9/1994 | Rao et al. . |
| 5,429,643 | 7/1995 | Lund et al. ........................... 29/623.3 |
| 5,527,642 | 6/1996 | Meadows et al. ...................... 429/210 |
| 5,562,741 | 10/1996 | Meadows et al. ..................... 29/623.2 |
| 5,595,840 | 1/1997 | Henning et al. ....................... 429/210 |
| 5,658,690 | 8/1997 | Lund et al. ........................... 429/210 |

*Primary Examiner*—Maria Nuzzolillo
*Assistant Examiner*—Carol Chaney
*Attorney, Agent, or Firm*—Leydig, Voit & Mayer, Ltd.

[57] ABSTRACT

A method of providing a molded plastic component for a bipolar battery comprising a metal substrate subject to warpage upon molding to form a plastic frame about the periphery of the metal substrate, and the molded plastic component itself, comprises preheating the metal substrate and then injecting a plastic having shrinkage characteristics which match those of the heated metal substrate so as to provide a plastic frame wherein the plastic-metal interface has a reliable seal and is free from residual stresses.

14 Claims, 4 Drawing Sheets

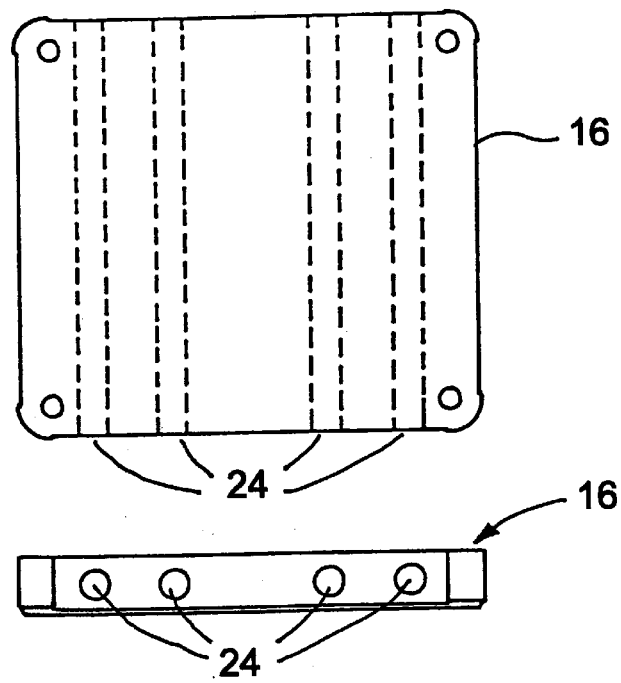
Fig. 2
Fig. 3
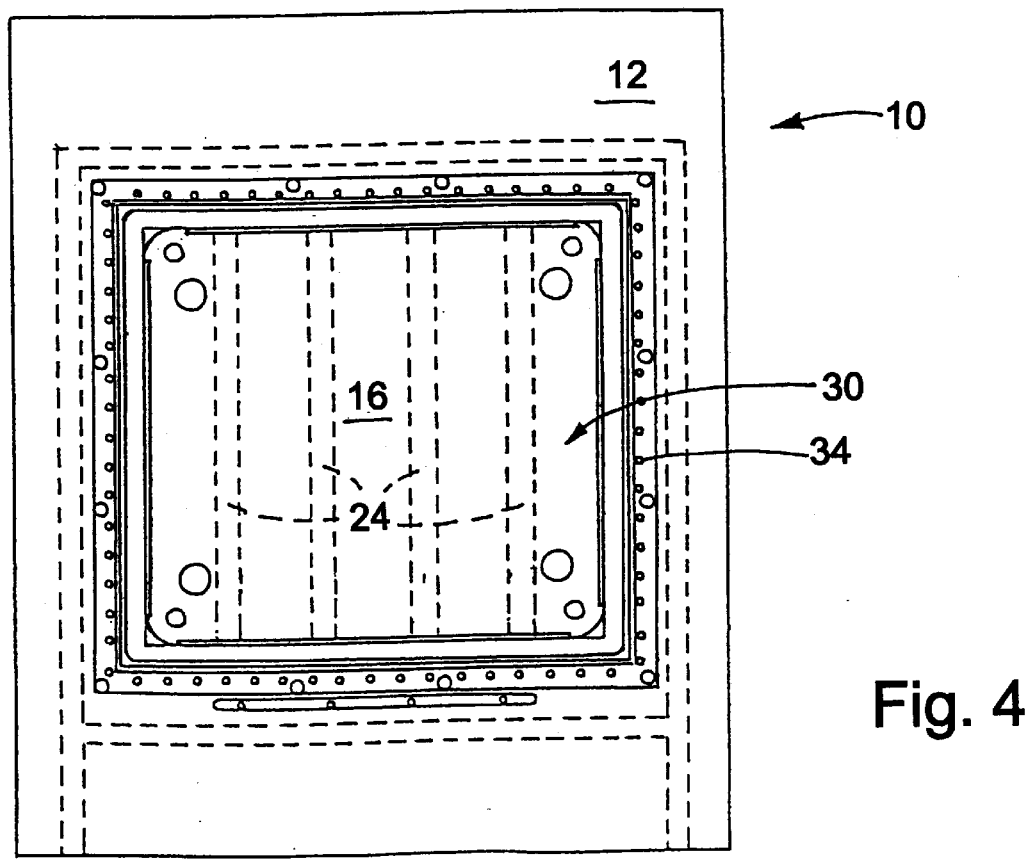
Fig. 4

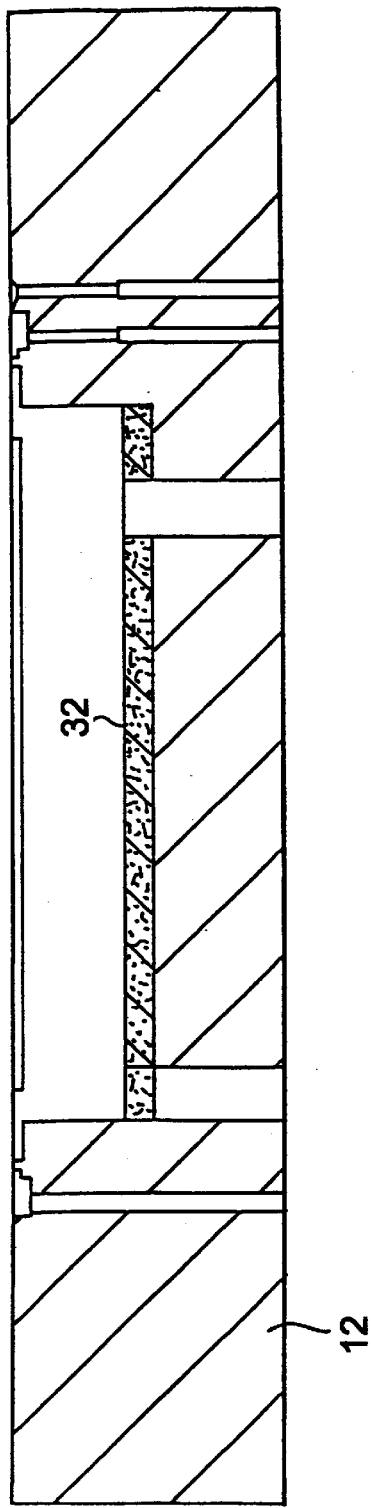
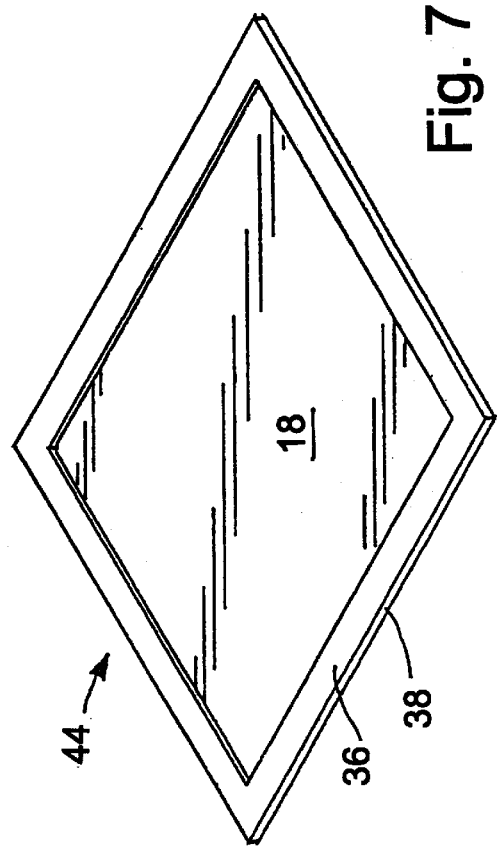
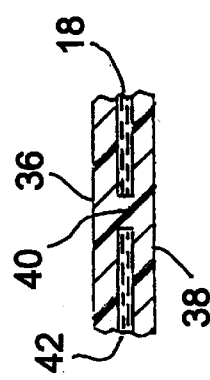

METHOD OF MANUFACTURING MODULAR MOLDED COMPONENTS FOR A BIPOLAR BATTERY AND THE RESULTING BIPOLAR BATTERY

This application is a continuation of U.S. patent application Ser. No. 08/613,925, filed Mar. 11, 1996, now abandoned.

FIELD OF THE INVENTION

This invention relates to batteries such as, for example, bipolar batteries utilizing modular molded components comprising a metallic substrate molded into a plastic frame and to the resulting battery.

DESCRIPTION OF THE PRIOR ART

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system has provided a reliable energy source which is capable of being manufactured in automated production while providing acceptable quality. However, one serious drawback of either the flooded or sealed, absorbed electrolyte, lead-acid batteries is the relatively low energy and power density (i.e., kilowatts/unit weight and watt-hours/unit weight, respectively) provided by such systems. It has long been a desire to provide an energy source with the reliability of a flooded or sealed lead-acid battery system while at the same time achieving a much greater energy and power density.

For this reason, considerable effort over at least the last 20 years has been directed to using lead-acid and other electrochemical systems in a bipolar design. In such a design, by definition, the positive and negative plates in some fashion share the same conductive grid or substrate. Some of the patents relating to bipolar batteries or to components and the like for such batteries include the following United States patents: U.S. Pat. No. 2,416,576 to Franz et al; U.S. Pat. No. 2,496,709 to Jelardin; U.S. Pat. No. 2,966,538 to Bernot; U.S. Pat. No. 3,728,158 to Poe et al.; U.S. Pat. No. 3,775,189 to Jaggard; U.S. Pat. No. 3,910,731 to Warszawski et al.; U.S. Pat. No. 3,941,615 to McDowall; U.S. Pat. No. 4,125,680 to Shropshire et al.; U.S. Pat. No. 4,964,878 to Morris; and U.S. Pat. No. 5,068,160 to Clough et al.

Some of these patents utilize metallic substrates which are molded into a plastic frame of varying configurations. However, there are a variety of technical problems that need to be addressed and solved when utilizing this approach. Indeed, some of the diverse problems precipitated alternative approaches which did not utilize metallic substrates. U.S. Pat. No. 4,658,499 to Rowlette is not only directed to such an alternative approach, but sets forth, as background, various other alternative approaches which have been suggested.

Thus, despite the substantial advantages that could be achieved using bipolar batteries and cells and the substantial amount of work and attention directed to this type of battery over at least the last 20 years, it would appear that bipolar batteries, such as bipolar lead-acid batteries, have remained a very promising but elusive curiosity, largely remaining as a laboratory curiosity. Thus, the need existed for a well-designed bipolar battery that would achieve the enhanced energy and power densities that only a bipolar battery can provide while satisfactorily dealing with the diverse problems in assembling and design identified by the prior art. More particularly, there existed a substantial need for a bipolar battery design composed of components that could be assembled in a automated, reliable fashion, while achieving a well-functioning battery in a cost-effective manner. U.S. Pat. No. 5,429,643 to Lund et al., assigned to the assignee of the present invention, does provide a method for assembling a bipolar lead-acid battery which is amenable to automated production at commercially acceptable production rates, utilizing modular bipolar battery components which include a series of molded plastic frames with metallic inserts.

Nevertheless, and while the plastic molding operations involved are, in general, relatively straightforward, the extreme differences in thermal expansion and contraction characteristics between the metallic substrate and the type of plastic material that has been used for the frame create problems in controlling the molding operation. This situation is exacerbated by the fact that the metallic substrate used as the bipolar plate is necessarily relatively thin, and is susceptible to buckling, warpage, and the like, both during molding and in subsequent handling and processing steps. There accordingly exists a need to provide modular plastic components, that are characterized by enhanced freedom from such warpage, buckling and the like so as to provide a bipolar battery having more consistent electrical performance due to improved uniformity of plate separation and of active material paste thicknesses.

Another significant problem which can occur in molding plastic components for bipolar batteries concerns stress factors which can result from the molding operation. Such stress factors and the like can manifest themselves in leakage and other problems in the resulting battery.

Indeed, the broader problem is to provide molded plastic components that are relatively free from leakage problems regardless of whether the leakage results from stress-induced issues in the molded part or not. More particularly, it has been found previously to be quite difficult, if not impossible, to provide such molded plastic components that reliably retain a satisfactory seal at the plastic-metal interface. This very problem, it is believed, is one primary reason why others in this field have attempted to employ approaches not utilizing this type of molded plastic frame with an embedded metallic substrate, as discussed in the previously referenced Rowlette '499 patent.

It is accordingly a principal object of the present invention to provide a modular plastic frame for a bipolar battery having an embedded metallic substrate capable of providing a bipolar battery having reliable sealing characteristics. A more specific object provides such a modular plastic frame having a reliable seal along the plastic-metal interface.

Another object of the present invention is to provide a modular plastic frame capable of providing a battery having improved uniformity of paste thickness. A related object provides a bipolar battery assembled from such modular plastic components characterized by improved performance characteristics.

A further object of this invention provides an easily automated, cost-effective method for forming such modular plastic components.

These and other objects and advantages of the present invention will be apparent from the following description and drawings.

SUMMARY OF THE INVENTION

In molding a modular component for a bipolar battery having a thin, flexible metallic substrate embedded in a plastic frame, the molding operation typically results in significant warpage, presumably due to differences in the thermal expansion and shrinkage characteristics of the plastic used for the substrate and of the metallic substrate itself. In general, the present invention comprises a method and apparatus for molding such modular components, as well as the resulting component and bipolar battery, which produces molded modular components that essentially eliminate warpage of the thin flexible substrate that can adversely affect not only subsequent handling of the molded part, but also the electrical performance of the resulting bipolar battery.

Additionally, and importantly, the present invention achieves a reliable seal at the plastic-metal interface that is essential to a bipolar battery which is leak-free or essentially so. To these ends, and in summary, the present invention utilizes a selection of materials, an insert for suitable preheating the thin metallic substrate and a mold configuration that combine to allow the extent of shrinkage of the plastic frame and the metallic substrate to be matched, providing a molded component free from residual stresses or the like that could impair the seal at the plastic-metal interface. Indeed, it is believed that the present invention can achieve molded components having the quality needed to allow commercial production of such components for bipolar batteries.

BRIEF DESCRIPTION OF THE DRAWINGS

FIG. 2 is a top elevation view of the heated insert shown in FIG. 1;

FIG. 3 is a side elevation view of the heated insert shown in FIGS. 1 and 2 and illustrating the positioning of the heating element;

FIG. 4 is a top elevation view of the bottom half of a mold that may be used in conjunction with this invention and showing the positioning of the insert in the mold cavity as well as the configuration of the mold cavity for the plastic frame;

FIG. 5 is a partial dross-section of the mold shown in FIGS. 1 through 4 and illustrating the positioning of the insulation in the mold;

FIG. 6 is a partial schematic view of the resultant molded bipolar component part according to a preferred embodiment of the present invention and showing the positioning of the molded plastic frame relative to the embedded metallic substrate;

FIG. 7 is a schematic perspective view of one of embodiment of the resultant molded component part of the present invention.

DETAILED DESCRIPTION OF THE INVENTION

Figure 1:
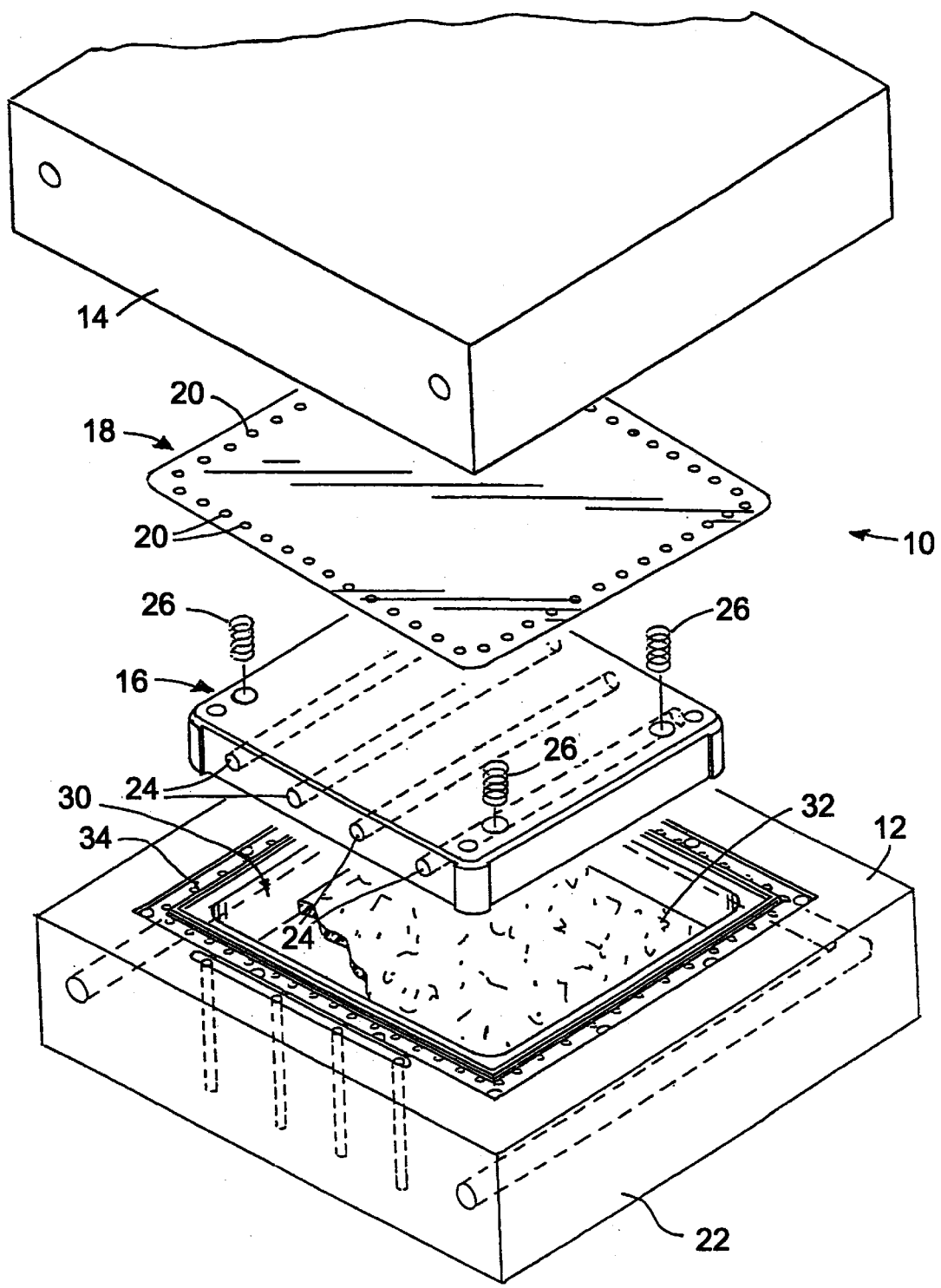
FIG. 1 is an exploded perspective schematic view of a mold which can be used in the present invention and showing the position of the heated insert used to control the expansion of the metallic substrate positioned in the cavity of the mold.

The present invention is directed to providing molded plastic, modular electrochemical components, often termed "frames," which may be configured to provide the desired voltage and capacity characteristics in the resulting bipolar battery. Each of such components comprise a thin metallic substrate embedded in a plastic frame which surrounds the periphery of the substrate, leaving an exposed surface or surfaces which can then be pasted with either negative or positive active material paste, or both, depending upon the configuration. Any suitable configuration considered desirable for a particular application can be utilized.

One illustrative configuration is shown and described in U.S. Pat. No. 5,348,817 to Rao et al. In that configuration, end frames, active frames and a center frame are utilized.

More particularly, as is described in the '817 Rao et al. patent, the end frames comprise a thermoplastic peripheral frame having a conductive member embedded therein. Any conductive material suitable for the particular electrochemical system of the bipolar battery involved may be used. As one illustrative embodiment, for use with a lead-acid bipolar battery, the conductive member can comprise a lead or a lead alloy. Materials of this type are known and are available. In any event, the metallic substrate or conductive member is relatively thin and flexible. As one illustrative example, the thickness of the metallic substrate can be 0.008 inch and may typically range from about 0.008 inch to about 0.030 inch. The range for the thickness can be varied as is desired for the particular application, and the range set forth is for purposes of illustration only.

As described in the Rao et al. patent, the end frames are unipolar, and both end frames may thus be pasted to be either positive or negative as is desired. The center frame utilized in the Rao et al. patent may be made similar to the end frames. Thus, the center frame may be molded from a thermoplastic material and may utilize a conductive member as a lead or a lead alloy or any other desired metallic substrate. The substrate may then be coated with conventional lead-acid battery paste. Pursuant to the Rao et al. '817 patent, both faces of the center frame are pasted to be either positive or negative. Whether the center frame is pasted to be positive or negative will depend on the terminal arrangement desired. When the central frame is pasted to be a central bi-negative plate to provide a negative central terminal, the end frames will be pasted to be positive plates, and vice-versa when a central bi-positive plate is used.

Bipolar active frames may be molded from a thermoplastic material and have embedded therein a conductive material as previously described with the other frames. Both faces of the lead alloy sheet or other metallic substrate utilized are coated with conventional lead-acid battery paste, one face being coated with a negative paste layer and the other with a positive paste layer.

The entire sheet of conductive member of the active frames serves the same purpose as an intercell connector in a conventional lead-acid battery. The high ratio of the intercell connection area to the pasted area and the very short intercell current path gives the bipolar battery design tremendous performance advantages in comparison to conventional lead-acid battery designs.

To form a recombinant or valve-regulated bipolar battery, highly absorbent glass separators made from microfine fibers are utilized. Such glass fiber separators are known and may be used, as may absorbent separators made from the microfine synthetic fibers only or made from a combination of synthetic and glass fibers. The thickness of the separators should be such as to provide the battery with adequate absorptivity so that sufficient electrolyte will be retained to provide the desired capacity, as is known. Additionally, as is also known, it is generally necessary and desirable to compress the separator by about 15 to 30 percent of the uncompressed thickness. Additional voltage and capacity are provided by employing additional active frames, positioned in the frame stack as described in the Rao et al. '817 patent. The preferred method of assembly of the respective frame members into a bipolar battery is disclosed in the aforementioned Lund et al. '643 patent, the disclosure of which is herein incorporated by reference.

It should be appreciated that the configuration for the various frame members can be varied as desired. In general, all that is required is that the metallic substrate should be adequately embedded in the frame about its periphery and the frame member should have adequate surface area to allow necessary further processing and assembly, such as, is, for example, illustrated and described in the aforementioned Lund et al. patent.

Pursuant to the present invention, a method and apparatus is provided for making bipolar frame elements which yield novel bipolar frame elements characterized by a reliable seal at the plastic-metal interface of the bipolar frames which is essential to providing a bipolar battery which is at least essentially leak-free. The resulting bipolar battery is also characterized by improved electrical performance as will be discussed herein.

To this end, and as is shown in FIG. 1, the apparatus of the present invention provides a mold shown generally at 10 comprising a bottom half 12 and a top half 14 which can suitably be the mirror image of the bottom half 12. In accordance with this invention, a heated insert 16 is provided so that the metallic substrate 18 will be preheated as will be discussed hereinafter. Similarly, as will also be discussed hereinafter, pursuant to a preferred embodiment of the present invention, the substrate 18 is provided with a series of spaced apertures 20 about its periphery.

As far as the general mold configuration is concerned, other than the aspects specifically discussed herein, the mold 10 can be configured as desired, as is known. More particularly, suitable mold configurations are known for providing a plastic frame with an embedded metallic substrate and may be utilized. Typically, such molds will provide core locks or the like for holding the metallic substrate in place as the molten plastic material is injected to provide the plastic frame. Similarly, suitable means for cooling the thus-injected plastic frame are known, such as water channels 22 for injecting water or other fluid to provide the desired cooling.

Further, the molding conditions which may be used do not form a part of the present invention. Suitable pressure and velocity conditions for injecting the plastic material to mold the desired frame around the substrate 18 are well known and may be used. Indeed, depending upon the materials used and the relative thickness of the substrate 18, suitable conditions may be determined by straightforward experimentation, followed by examination and testing of the resulting bipolar frame.

In accordance with one aspect of the present invention, the metallic substrate 18 is preheated so as to cause the substrate 18 to expand as will be discussed more fully hereinafter. However, in general, any suitable means can be utilized to heat insert 16 to the temperature desired, preferably prior to beginning to inject the molten plastic into the cavity of mold 10. The temperature desired will be dependent upon the thickness of substrate 18 and the alloy or the like employed, and will typically be in the range of from about 120° to 135° C. for the pure lead or for the lead alloys typically utilized as metallic substrates for bipolar frames. As can be seen in FIGS. 1–3, conventional tube heaters 24 have been found satisfactory to provide the desired pre-expansion of the substrate 18.

In the preferred embodiment of the mold used in the present invention, biasing structure is provided to hold the heated insert 16 and the substrate 18 in close contact. As best seen in FIG. 1, such biasing structure can suitably comprise springs 26.

Another aspect of the mold used in the present invention provides a configuration designed to minimize heat transfer from the heated insert 16 to the mold 10. As may thus be appreciated, any heat transference from the heated insert 16 to mold 10, of course, negates the underlying purpose of heating and pre-expanding the insert 18. Any means that satisfactorily prevents, or at least substantially eliminates, such heat transference may be used.

To this end, in the preferred embodiment, as best seen in FIGS. 1 and 4–5, the heated insert 16 is configured so that contact with the mold 10 occurs only at corners 28 of the cavity shown generally at 30. Heat transference is further prevented by providing a layer of insulation 32, as best seen in FIG. 5. The insulation layer 32, shown in the bottom half of the mold 12, is suitably positioned on the top half of the mold 10, as well. Any suitable insulation capable of preventing heat transference in view of the temperature range to which the heated insert is typically heated may be used. Many are known and are suitable. As one illustrative example of a suitable insulating material, a commercially available, glass fiber insulation mat may be used at a thickness of about 0.225 inch. More particularly, this commercially available glass fiber insulation may be described as DME brand glass fiber insulation stock.

As can be also seen from FIGS. 1 and 4, the mold cavity 30 is also provided, in the illustrative preferred embodiment, with mold apertures 34. The mold apertures 34 are positioned between apertures 20 of the substrate 18 and allow core locks (not shown) to hold the substrate 18 in the desired position during molding.

In accordance with an important aspect of the present invention, the plastic material used for the bipolar frame and the material for the substrate are selected so as to match the extent of shrinkage of the cooled molten plastic and the heated substrate cool. In this fashion, and pursuant to an important objective of the present invention, the resulting bipolar frame is formed with a desirable seal at the interface between the embedded substrate and the plastic frame. Any stress induced in the plastic is thereby minimized, as is any undue shrinkage that would otherwise result in the plastic tending to recede away from the metallic substrate. Likewise, the present invention minimizes any potential adverse effects upon the electrical performance of the cell or battery. The relative shrinkage rates of the metallic substrate and that of the plastic material can be determined experimentally by straightforward techniques.

In general, for pure lead and for the lead alloys used for the metallic substrates, the rate of shrinkage will be about 0.000029 inch/inch per degree Centigrade. Pure lead shrinks at a slightly greater rate than do lead alloys commonly used for lead-acid battery applications. This level of shrinkage is substantially less than that of the polypropylene material (more specifically an ethylene-propylene copolymer in which propylene predominates) that is typically used as the container material in automotive lead-acid batteries and the like and is useful in this invention. However, the shrinkage in the plastic polymer material can be reduced by utilizing fillers such as glass beads, fibers, and the like so that the extent of shrinkage will more closely match that of the metallic substrate. To this end, as one illustrative example, a polypropylene material commonly used for lead-acid battery containers filled with about 20% by weight of glass beads will provide a shrinkage of about 0.0035 inch per inch of the polypropylene material. More generally, any filler can be used which is compatible with the polypropylene material in an amount which will result in reducing the level of shrinkage to match that of the metallic substrate being cooled. Indeed, consistent with the objectives of this invention, any plastic material can be employed which, with or without a filler to adjust the shrinkage, matches the extent of shrinkage of the metallic substrate, and otherwise satisfies the requirements for the particular bipolar battery.

Pursuant to a most preferred aspect of the present invention, a bipolar frame structure is utilized in which the entire structure, in effect, shrinks as a unit so as to minimize any differential shrinkage that might otherwise result from the various layers comprising the frame. More specifically, and to this end, the metallic substrate is provided with a series of apertures or the like extending about its periphery so that the top and bottom layers of plastic are intermittently joined together, providing a composite structure which shrinks as a single unit. This avoids the possibility that the top and bottom layers of plastic in which the metallic substrate is embedded can shrink at rates and extents which are somewhat different. Such differing shrinkage potentially could result in diminution of the overall reliability of the seal. As one illustrative example, it has been found satisfactory to provide apertures of about 0.06 inch diameter spaced about ⅜ of an inch apart. The size of the apertures and the spacing can vary as desired, consistent with the objectives as discussed herein. Indeed, more generally, any other modification to the substrate can be utilized which will result in the various parts of the plastic frame shrinking together as a unit.

FIG. 6 shows a partial schematic view of a bipolar frame in which the metallic substrate 18 has an upper layer of plastic 36 and a lower layer of plastic 38 joined together by a connecting segment 40, resulting from the plastic which flows through the apertures 20 in substrate 18. As previously discussed, it is the plastic segments 40 which intermittently interconnect plastic layers 36 and 38, causing the entire plastic structure to shrink as a unit.

As may also be seen in FIG. 6, pursuant to a preferred aspect of the present invention, the seal reliability may be further enhanced by a coating 42 disposed between the plastic layers 36 and 38 and the metallic substrate 18. More particularly, the coating 42 may be any gasket material, or any of the many materials utilized for coating terminals and other components in lead-acid batteries. As one illustrative and preferred example, an "Opanol" material may be used (a commercially available gasket material including polyisobutylene, pine tar and hexane or trichloroethylene, Water Gremlin, White Bear Lake, Minn. An appropriate coating layer can be achieved simply by coating the metallic substrate prior to the substrate being placed in the mold. It is believed that the unitary shrinkage, resulting when the preferred embodiment of the bipolar frame structure shown in FIG. 6 is utilized, further serves to enhance the reliability of the seal when an Opanol or other coating material is utilized as well. Thus, the resulting shrinkage about the metallic substrate serve to further enhance the supplementary sealing function resulting from the positioning of the Opanol or other gasket material layer between the metallic composite and the surrounding plastic layers 36 and 38 and plastic segments 40.

FIG. 7 shows the resulting frame member. The frame member 44 thus comprises the metallic substrate 18 embedded in the plastic frame formed from the top layer 36 and bottom layer 38. The frame member can be a bipolar frame member, an end frame, or a central frame, as discussed in the Rao et al. '817 patent, or any frame useful in making a bipolar battery.

As should be appreciated, the respective dimensions of the plastic frame and the metallic substrate together with the respective shrinkage rates of the materials being used (and the temperature to which the metallic substrate is heated) will determine the extent of shrinkage of the frame and substrate. Whether the extent of shrinkage (i.e., the distance each component shrinks) has been satisfactorily matched pursuant to the present invention can be readily determined in a straightforward fashion.

First of all, whether the extent of shrinkage for the plastic frame and metallic substrate have been satisfactorily matched in accordance with this invention can be determined by visual examination of the molded component. If the metallic substrate appears to be flat, then satisfactory matching has been achieved. Such visual examination should be carried out after the molded component has been given adequate time to cool and cure, 24 hours after molding being adequate.

A relatively flat substrate is certainly preferred because such a flat surface indicates that a reliable metal-plastic interface seal is provided and that a uniform paste thickness can be achieved. A uniform paste thickness equates to uniform cell-to-cell (or battery-to-battery) electrical performance.

While preferred, it is unnecessary to so closely match the shrinking characteristics of the substrate and the plastic that the substrate is perfectly flat. The extent of variation from a flat surface is that which can be tolerated in a particular application. Further, and while not achieving all of the advantages of the present invention, it is still within the present invention to provide a molded component having a substrate such that the paste thickness (measured across both the length and width of the pasted substrate surface) does not vary more than about 50%. It is preferred to have a variation in the paste thickness of no more than about 25, more preferably, no more than about 10%.

As to whether the shrinking characteristics have been sufficiently matched so as to provide a reliable seal, as is preferred,this can be determined by using any commercially available pressure decay test equipment (e.g., Qualitech). Such test equipment includes a pressure fill period (5–10 seconds) and an equalization period (5–20 seconds). Thereafter, a differential pressure of 3 psi is imposed on one surface of the metallic substrate for a test period of 1–5 seconds. The total pressure decay read on the instrument (in millibars) is then divided by the number of seconds the test ran (i.e., 1 to 5 seconds). If the millibars/second exceeds 1.0, then the molded component does not have satisfactorily matched extents of shrinkage. Preferably, for molded components in accordance with this invention, the test value should be no more than about 0.5 millibars per second, and, even more preferably, the test value should be no more than about 0.25 millibars per second.

As those skilled in the art appreciate, any test rig can be used to hold the molded component and to fill the right with the pressure needed. All that the particular rig used need do is to allow one surface of the metallic substrate to experience an air pressure of 3 psi more than that to which the other substrate surface is exposed.

Further, as may be appreciated, a pressure differential of 3 psi may be too much and cause the metallic substrate to buckle during the test (e.g., where the molded component is a relatively small size). If buckling occurs, then the pressure differential used in the test procedure should be lessened, pressure differentials down to 1 psi being still suitable. Any component having a test value of 1.0 millibars/second has improperly matched shrinking rates. However, with lower pressures the preferred and more preferred test values should be reduced proportionately with the reduced pressure differential used (e.g., using a pressure differential of 1.5 psi rather than 3 psi, test values of less than 0.25 millibars per second, and, more preferably, less than 0.125 millibars/second should be used).

Still further, it has been found that once the process parameters have been calibrated for a specific modular component, the resulting molded parts will reliably possess satisfactorily matched shrinking characteristics. It then becomes unnecessary to do anything more than random testing, e.g., testing 1 out of 50 components.

The bipolar frame components can then be assembled to provide a cell having the desired voltage and capacity. An appropriate stacking of the electrical components is shown in FIGS. 2A and 2B of the '643 Lund et al. patent. In general, each bipolar active frame will be positioned such that the negative paste layer faces the positive paste layer of one end frame. Correspondingly, the positive paste layer of each bipolar active frame will face a negative paste layer of the central frame. When additional voltage and capacity are desired, additional active frames are employed, positioned in the frame stack as described herein. The assembly of the respective bipolar frame members into a battery can then be carried out as is desired, preferably utilizing the method disclosed in the previously reference '643 Lund et al. patent, the disclosure of which is herein incorporated by reference.

Figure 8:
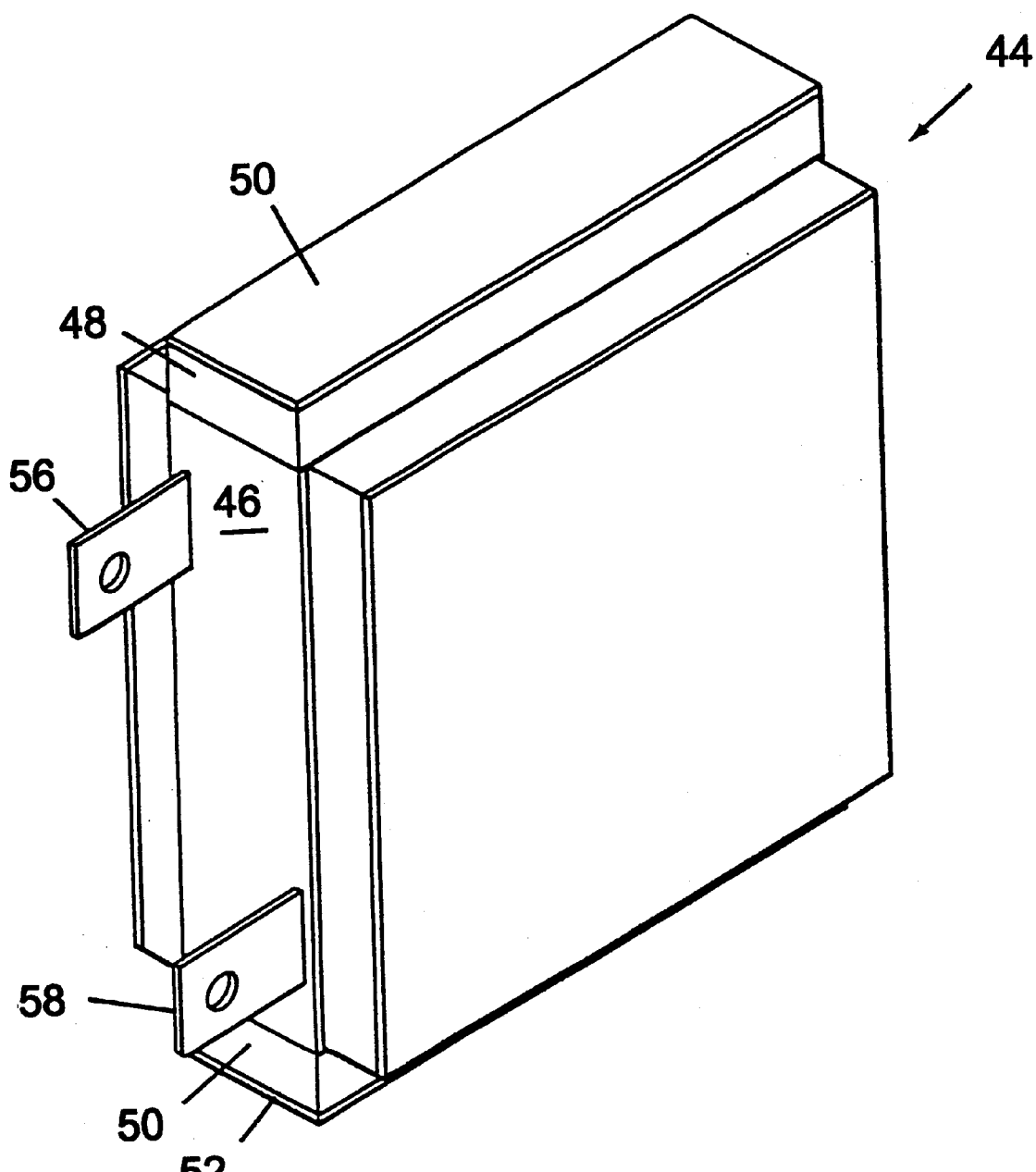
FIG. 8 is one embodiment of a bipolar battery according to the present invention utilizing the molded plastic component.

FIG. 8 illustrates a suitable bipolar battery made using the molded modular components of the present invention. The bipolar battery 44 thus comprises side panels 46, fill/vent box 48, fill/vent box cover 50, vacuum box 52, vacuum box cover 54, positive terminals 56 and negative terminal 58 which may be electrically connected by using electrical jumpers/bus bars installed as necessary to provide the electrical connections desired. The further assembly and configuration of the battery is described in the Lund et al. '643 patent herein identified, the disclosure of which is herein incorporated by reference.

The active material positive and negative paste can be applied to the metallic substrate by any suitable means. The previously mentioned '817 patent to Rao et al. describes suitable active material paste; and the disclosure is herein incorporated by reference. Of course, the active material paste can be any suitable for the particular application. In this regard, what the present invention provides is the ability to achieve in the resulting assembled battery uniform plate separation, as well as allowing the paste to be applied in essentially uniform manner and depth. This should then translate to more predictable electrical performance of the resulting battery.

In addition, and as has been seen, the present invention provides a facile method for making modular plastic components for a bipolar battery which prevents the undesirable warpage that would otherwise occur in molding, which warpage would not only affect the uniformity of the paste thickness but would also adversely affect the reliability of the seal between the metallic substrate and the plastic frame. Indeed, it is believed that the present invention provides a breakthrough, allowing for the first time a feasible method for manufacturing on a commercially acceptable basis bipolar plate frames.

While the present invention has been illustrated and described herein with respect to certain preferred embodiments, it should be appreciated that the present invention is not so limited. Thus, for example, while the present invention has been described principally in conjunction with a bipolar lead-acid battery, it should be appreciated that the present invention is likewise applicable to any type of a bipolar battery which can utilize a molded modular component comprising a metallic substrate embedded in a plastic frame member and which is subject to the warpage problem described herein. Of course, the active material paste and other aspects of the battery design will vary with the particular electrochemistry involved. Even further, while a metallic substrate has been exemplified, it should be appreciated that the invention is also applicable to use with electrically conductive, as well as to metallic substrates.

We claim:

1. A bipolar battery comprising a plurality of molded plastic components each of the molded plastic components comprising a metal substrate having a periphery and subject to warpage upon molding with a plastic, a plastic frame about the periphery of the metal substrate, the periphery of the metal substrate being embedded in the plastic, at least one surface of the metal substrate being suitable for accepting an active material paste, and active material paste on said surface, the shrinkage characteristics of the plastic frame matching those of the metallic substrate.

2. The bipolar battery of claim 1, wherein the metal substrate is a lead alloy and the bipolar battery is a lead-acid bipolar battery.

3. The bipolar battery of claim 1, wherein the shrinkage characteristics have been matched such that the thickness of the paste has a variation of no more than about 50%.

4. The bipolar battery of claim 1, wherein the shrinkage characteristics have been matched such that the thickness of the paste has a variation of no more than about 25%.

5. The bipolar battery of claim 1, wherein the shrinkage characteristics have been matched such that the thickness of the paste has a variation of no more than about 10%.

6. The bipolar battery of claim 1, wherein the shrinkage characteristics are matched such that a pressure decay value is no greater than about 1.0 millibars/second.

7. The bipolar battery of claim 1, wherein the shrinkage characteristics are matched such that a pressure decay value is no greater than about 0.5 millibars/second, using a 3 psi pressure differential.

8. The bipolar battery of claim 1, wherein the shrinkage characteristics are matched such that a pressure decay value is no greater than about 0.25 millibars/second, using a 3 psi pressure differential.

9. The bipolar battery of claim 1, wherein the shrinkage characteristics are matched such that a pressure decay value is no greater than about 0.25 millibars/second, using a 1.5 psi pressure differential.

10. The bipolar battery of claim 1, wherein the shrinkage characteristics are matched such that a pressure decay value is no greater than about 0.125 millibars/second, using a 1.5 psi pressure differential.

11. The bipolar battery of claim 1 wherein the metallic substrate has a series of apertures positioned about its periphery thereby providing a composite structure shrinking as a single unit.

12. The bipolar battery of claim 1 wherein the plastic comprises polypropylene having a glass filler.

13. The bipolar battery of claim 12 wherein the glass filler comprises glass fibers.

14. The bipolar battery of claim 1 wherein the periphery of the metallic substrate is coated.

* * * * *

UNITED STATES PATENT AND TRADEMARK OFFICE
CERTIFICATE OF CORRECTION

PATENT NO. : 6,017,653　　　　　　　　　　　　　　　　　　Page 1 of 1
DATED : January 25, 2000
INVENTOR(S) : Petrakovich et al.

It is certified that error appears in the above-identified patent and that said Letters Patent is hereby corrected as shown below:

Title page,
Item [56], References Cited, U.S. PATENT DOCUMENTS,
Line 9, "5,035,045" should read -- 5,053,045 --.

Column 7,
Line 55, "Minn. An" should read -- Minn.). An --.

Column 8,
Line 43, "25," should read -- 25%, --.
Line 47, "preferred,this" should read -- preferred, this --.

Column 10, claim 1,
Line 30, "and active" should read -- and the active --.

Signed and Sealed this

Fifth Day of February, 2002

*Attest:*

*Attesting Officer*　　　　JAMES E. ROGAN
　　　　　　　　　　　　*Director of the United States Patent and Trademark Office*